P. J. HARDY.
Application of Stone to Building Purposes.

No. 163,992. Patented June 1, 1875.

5 Sheets--Sheet 1.

WITNESSES:
Jas. T. Hutchinson
John R. Young

INVENTOR.
P. J. Hardy, by
Prindle and Co his Attys

5 Sheets--Sheet 2

P. J. HARDY.
Application of Stone to Building Purposes.

No. 163,992. Patented June 1, 1875.

WITNESSES:
Jas. E. Hutchinson
John R. Young

INVENTOR.
P. J. Hardy, by
Prindle & Co. his Attys

THE GRAPHIC CO.PHOTO-LITH.39 & 41 PARK PLACE,N.Y.

5 Sheets--Sheet 3.

P. J. HARDY.
Application of Stone to Building Purposes.

No. 163,992. Patented June 1, 1875.

WITNESSES:
Jas. E. Hutchinson
John R. Young

INVENTOR.
P. J. Hardy, by
Prindle and Co, his Attys

THE GRAPHIC CO.PHOTO-LITH.39 & 41 PARK PLACE,N.Y.

5 Sheets--Sheet 4.

P. J. HARDY.
Application of Stone to Building Purposes.
No. 163,992. Patented June 1, 1875.

WITNESSES:
Jas. E. Hutchinson
John R. Young

INVENTOR.
P. J. Hardy, by
Prindle and Co., his Attys

P. J. HARDY.
Application of Stone to Building Purposes.

No. 163,992.  Patented June 1, 1875.

5 Sheets--Sheet 5.

WITNESSES:  INVENTOR.

UNITED STATES PATENT OFFICE.

PIERRE J. HARDY, OF NEW YORK, N. Y.

IMPROVEMENT IN THE APPLICATION OF STONE TO BUILDING PURPOSES.

Specification forming part of Letters Patent No. 163,992, dated June 1, 1875; application filed March 31, 1875.

CASE A.

*To all whom it may concern:*

Be it known that I, PIERRE J. HARDY, of New York city, in the county of New York and in the State of New York, have invented certain new and useful Improvements in the Application of Marble or other Stone to Building Purposes; and do hereby declare that the following is a full, clear, and exact description thereof, reference being had to the accompanying drawings, making a part of this specification, in which—

Figure 1:
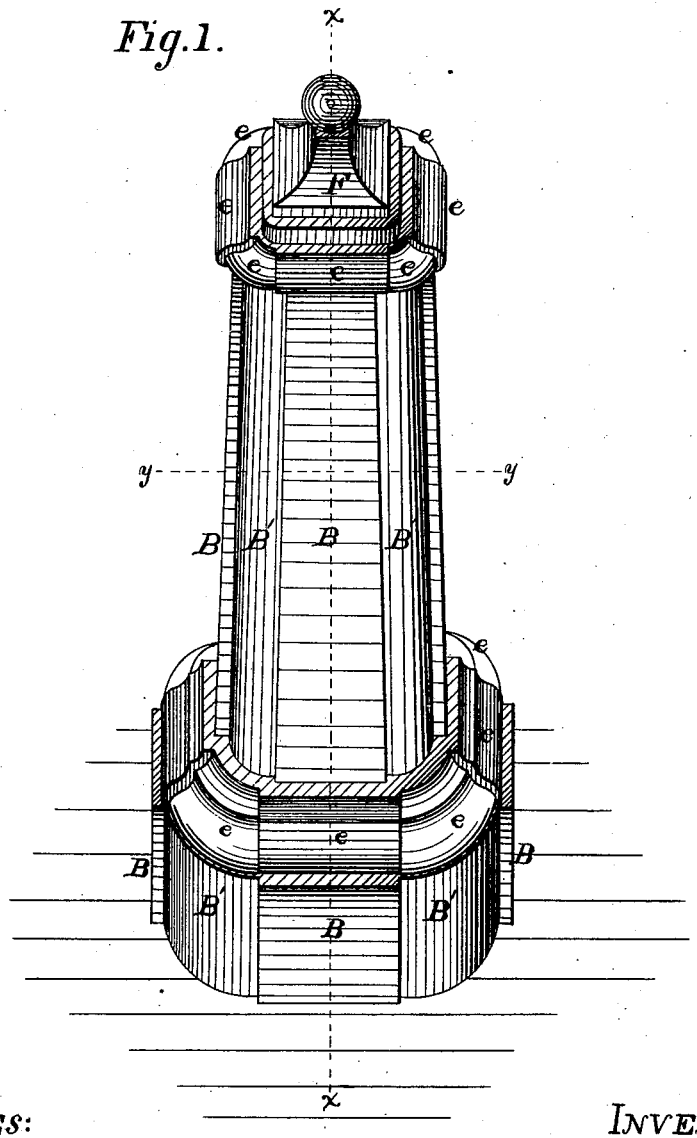
Figure 2:
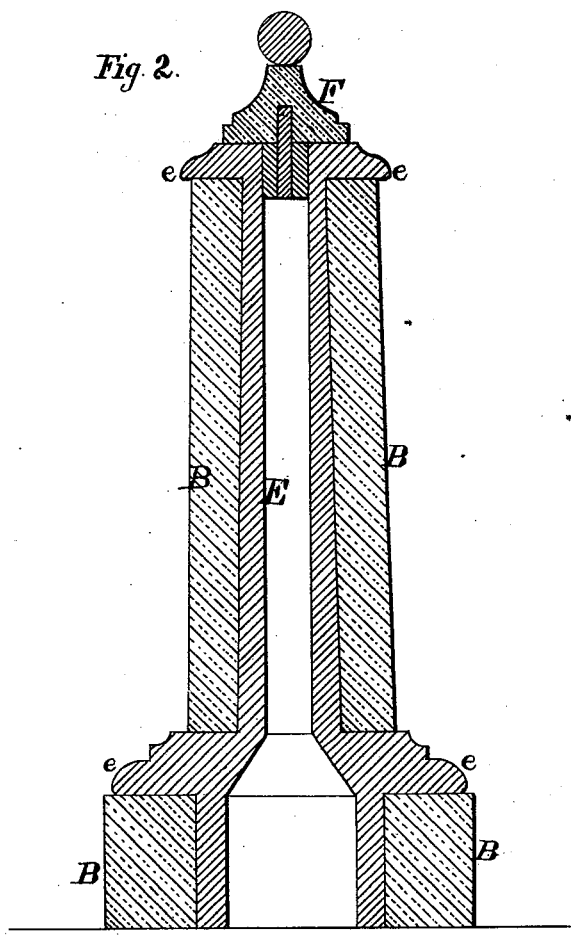
Figure 3:
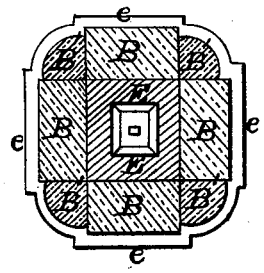
Figure 4:
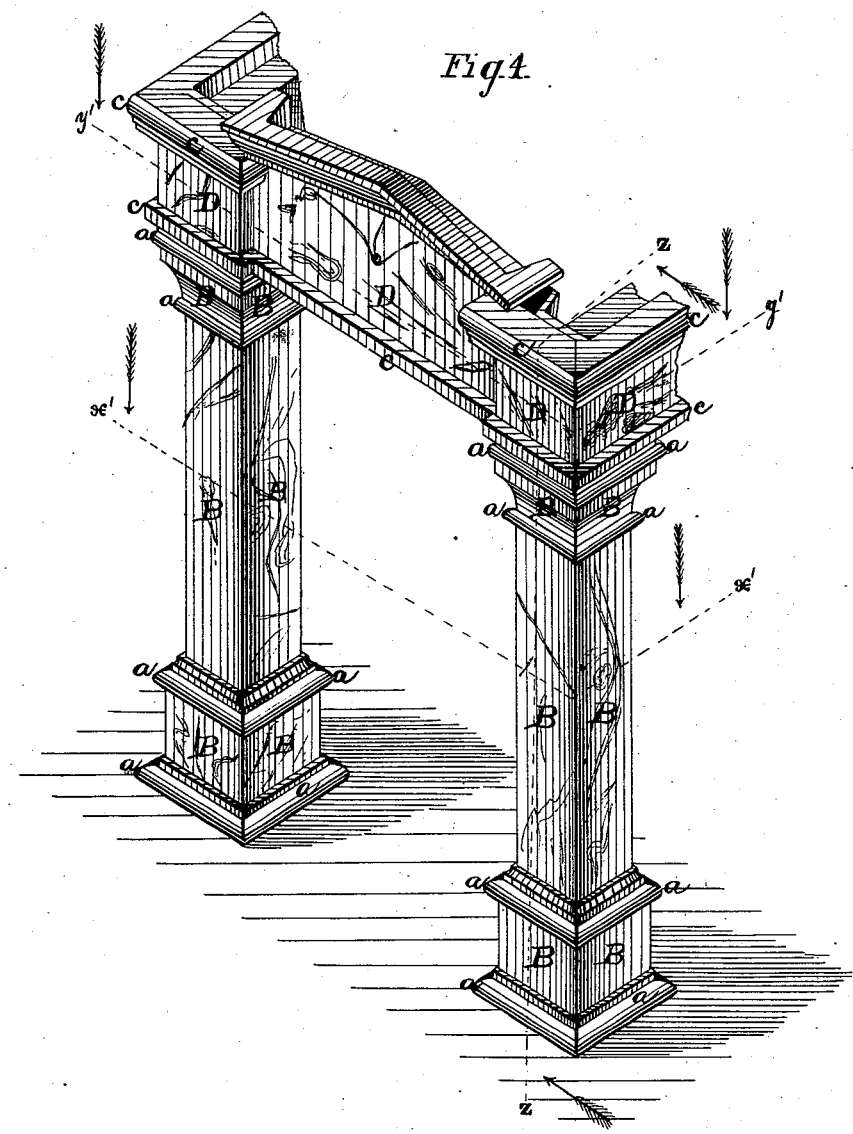
Figure 5:
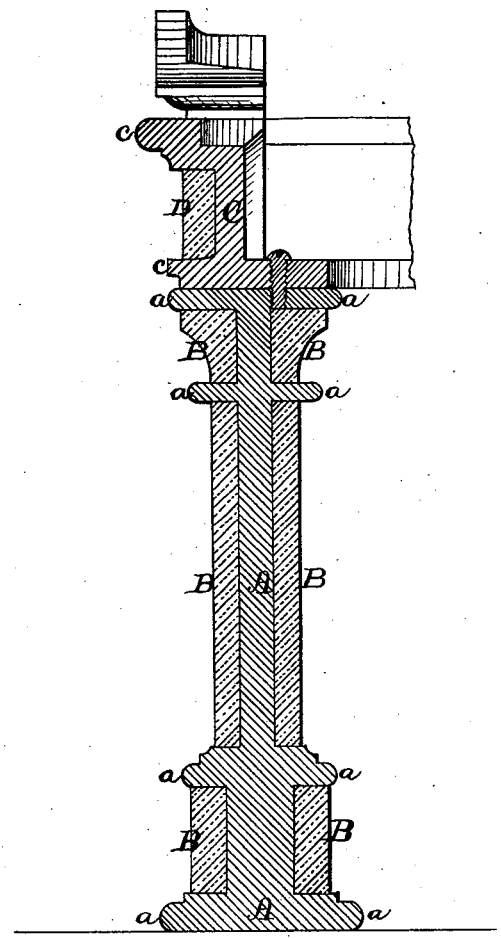
Figure 6:
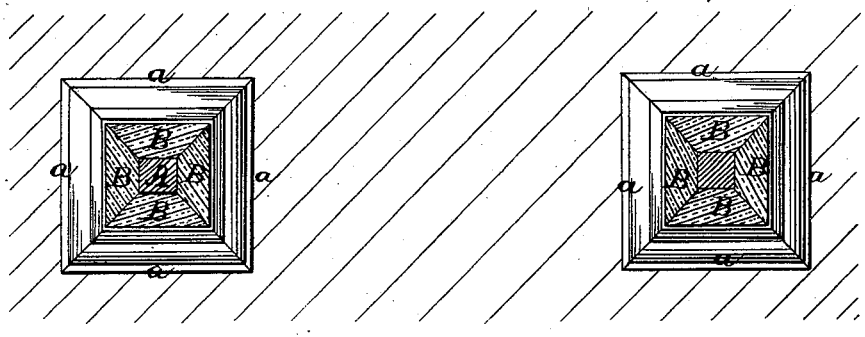
Figure 7:
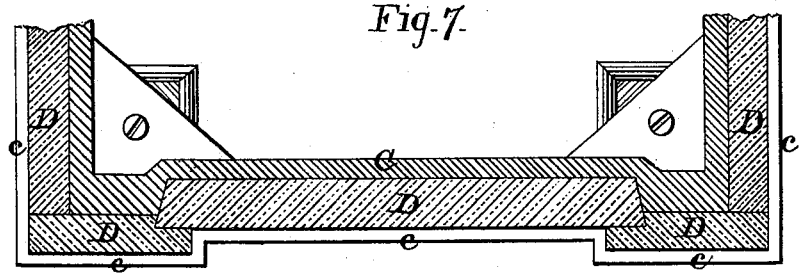

Figure 1 is a perspective view of a newel-post constructed after my improved method. Figs. 2 and 3 are, respectively, vertical and horizontal sections of the same upon lines $x\ x$ and $y\ y$ of Fig. 1. Fig. 4 is a perspective view of a portion of a portico constructed after said method. Fig. 5 is a vertical section upon line $z\ z$ of said Fig. 4; and Figs. 6 and 7 are horizontal sections upon lines $x'\ x'$ and $y'\ y'$, respectively, of Fig. 4.

Letters of like name and kind refer to like parts in each of the figures.

The design of my invention is to render the employment of marble and other valuable stone practicable for building purposes by lessening the quantity required and the cost of labor involved in its erection; to which end it consists in the combination of slabs of marble or other stone with metal supporting-frames for forming columns, newel-posts, and for other like architectural purposes, substantially as is hereinafter specified.

My invention is applicable, in a variety of ways, to building purposes; but it will sufficiently illustrate the same by showing its application in two of such ways.

In the annexed drawings, A represents a central core of a square column, constructed from iron, and having, near its upper and lower ends, horizontal enlargements $a\ a$, &c., which form the upper and lower moldings of the capital and base of said column. Between the moldings $a\ a$, &c., upon each side of the column, are placed slabs of marble or other stone, B B, &c., which fill out the line of said side, and at their ends are mitered or otherwise jointed to the contiguous edges of the slabs that form the other sides of said column, said joints being constructed so as to cause said slabs to present an appearance of unity and solidity.

The slabs B B, &c., are nicely fitted to and closely fill the spaces between the moldings $a\ a$, &c., and are preferably secured in place by means of cement, after which the exposed portions of the metal are painted, marbleized, nickeled, or in other manner finished, so as to cause them to correspond or contrast with the color and finish of the stone.

The frieze, cornice, and other parts supported by the columns are constructed in a similar manner, their strength being secured by means of a metal backing, C, their moldings $c$ being formed of iron, while their panels and plane faces D D, &c., are composed of slabs of marble or other stone, cemented or otherwise secured to said metal.

In Figs. 5, 6, and 7 is shown a newel-post constructed after my method, its center E being a hollow metal core, from the upper and near the lower ends of which project horizontally flanges $e$ and $e$, which are beaded upon their edges, and form the capital and the top of the base of said post.

The horizontal form of the post being that of a square, with round, sunk, or recessed corners, its sides are covered by means of four plane marble or stone slabs, B B, &c., which meet only at their inner corners, as shown in Fig. 7, and leave between their side edges right-angled recesses, that are filled by marble bars B' B', &c., each of which conforms upon two sides to the shape of its recess, while its outer face is formed upon a circular line.

The upper end of the post is finished by means of a marble cap, F, that rests upon and is secured to the metal core E.

In the construction of this post opportunity for marked contrasts is afforded, as the side and corner slabs may be formed of different-colored marbles, while the metal moldings may be painted or otherwise finished, so as to form a frame or setting for the same.

Having thus fully set forth the nature and merits of my invention, what I claim as new is—

In the construction of columns, newel-posts, and for other like architectural purposes, the combination of slabs of marble or other stone with metal supporting and inclosing frames, substantially as specified.

In testimony that I claim the foregoing I have hereunto set my hand this 20th day of March, 1875.

PIERRE J. HARDY.

Witnesses:
GEO. S. PRINDLE,
E. F. M. FAEHTZ.